United States Patent [19]

Raach

[11] Patent Number: 4,981,062
[45] Date of Patent: Jan. 1, 1991

[54] SAW BELT ROLLER

[75] Inventor: Peter Raach, Mössingen, Fed. Rep. of Germany

[73] Assignee: Gustav Wagner Maschinenfabrik GmbH & Co. KG, Fed. Rep. of Germany

[21] Appl. No.: 357,079

[22] Filed: May 25, 1989

[30] Foreign Application Priority Data

Jun. 3, 1988 [DE] Fed. Rep. of Germany ....... 3819018

[51] Int. Cl.$^5$ ............................................. B26D 1/54
[52] U.S. Cl. ......................................... 83/820; 83/788
[58] Field of Search ................. 83/788, 814, 820, 523; 474/94, 902, 903; 198/843

[56] References Cited

U.S. PATENT DOCUMENTS

| 918,248 | 4/1909 | Wysong | 83/788 |
|---|---|---|---|
| 1,916,903 | 7/1933 | Wine | 83/820 |
| 2,701,971 | 2/1955 | Carter et al. | 474/902 X |
| 2,954,061 | 9/1960 | Stordal | 83/820 X |
| 3,257,860 | 6/1966 | Runde et al. | 474/94 |
| 3,363,495 | 1/1968 | Turnbull | 83/788 X |
| 3,483,783 | 12/1969 | Robinson et al. | 83/788 |
| 3,935,780 | 2/1976 | Hoffmann | 83/788 X |
| 3,968,715 | 7/1976 | Cleland | 83/788 X |
| 4,002,081 | 1/1977 | Schultz, Jr. | 474/94 |
| 4,027,568 | 6/1977 | Cleland | 83/788 |
| 4,128,031 | 12/1978 | Sato | 83/788 X |
| 4,557,171 | 12/1985 | Stolzer | 83/788 X |

Primary Examiner—Douglas D. Watts
Assistant Examiner—Rinaldi Rada
Attorney, Agent, or Firm—Andrus, Sceales, Starke & Sawall

[57] ABSTRACT

Saw belt roller, in particular for horizontal belt saws, in which the peripheral or running surface (3) carrying the saw belt consists of a wear-resistant, hard, metal material. The metal joining piece (6) between the running surface (3) and the hub (5) of the saw belt roller (1) is interrupted by the insertion of a noise-damping, in particular viscoelastic, material (7), which is preferably selected from concrete polymer, silicone, rubber, in particular hard rubber, or similar elastomeric material.

3 Claims, 1 Drawing Sheet

SAW BELT ROLLER

The invention relates to a saw belt roller, in particular for horizontal belt saws, in which the peripheral or running surface carrying the saw belt consists of a wear-resistant, hard, in particular metal, material.

It is generally known that, in belt saws, the belt saw blade produces a shrill screeching noise when going around the saw belt rollers, in particular during the cutting process, the cause of this primarily being the fact that the saw belt vibrates in the transverse and longitudinal direction during the cutting process. In addition to the shrill screeching noise, which is very disturbing in the surrounding area, the vibrations of the belt saw blade also have a damaging effect on the accuracy of cutting and the cutting performance as well as on the useful life of the belt saw blade. Furthermore, the vibrating belt saw blade thoroughly spatters cutting oil, forming a mist of cutting oil. Finally, the vibrations of the belt saw blade result in a rough cutting surface on the cut workpiece and in a blade clearance which is broader at the beginning of cutting than the blade clearance which later develops and which is defined by the shape of the saw blade. In the case of more violent vibrations, it is no longer possible to achieve an accurate, straight cut.

To solve the problems mentioned, it is proposed, on the one hand, to provide the running surface of the saw belt roller with a contoured coating of elastic material (U.S. Pat. No. 3,363,495), with the running surface coating being formed, in accordance with DE No. C-2,740,212, by O-rings which lie spaced laterally from one another in dovetail-shaped peripheral grooves in the saw belt roller. However, this construction has the disadvantage that it is extremely susceptible to wear, so that the contoured coating of elastic material must be replaced after an extremely short operating time.

On the other hand, to solve the problem mentioned, it is proposed to alter the voltage and/or the free length of the belt saw blade periodically during operation of the belt saw (DE No. A-3,040,829). However, the measures required for construction of this solution are evidently complicated. To this end, one of the two saw belt rollers must be provided with a periodically effective tension drive by means of which the two saw belt rollers can periodically be moved closer together and further apart. Instead, a tension roller which is mounted so as to slide transversely with respect to the belt saw blade and which is periodically pressed against the belt saw blade by an adjusting drive can be arranged between the two saw belt rollers.

This last-mentioned construction is the current state of the art.

Independently of this, however, use is still also made today of fairly large cover hoods and cover plates in order to limit the emission of noise. Preferably, such enclosures of the belt saw blade and saw belt rollers are lined on the inside with sound-absorbent material. These measures are not suitable for the elimination of the "evil" of excessive noise levels or unacceptably high vibrations of the belt saw blade; however, they help to moderate the said evil.

SUMMARY OF THE PRESENT INVENTION

The present invention is based on the object of avoiding the stated disadvantages of the known constructions and of designing a saw belt roller such that low-noise, precise running of the belt saw blade is achieved while maintaining the high level of wear resistance.

Between the running surface of the saw belt roller, which is formed of material having a hard surface for reasons of wear, and the hub of the saw belt roller in accordance with a significant feature of the invention, a continuous material joining piece, in particular a metal joining piece, is interrupted, in particular by means of a noise-damping material. By using materials including concrete polymer, silicone, rubber, in particular hard rubber, or similar elastomeric material as the noise-and vibration-damping material, the strength and stability of the saw belt roller is not impaired. At the same time, however, a higher level of noise- and vibration-damping is achieved.

A particularly advantageous embodiment of construction includes a running surface supported via elastic strips or the like, in particular rings of rubber or the like, on the wheel disc defining the metal joining piece between the running surface and the hub. The running surface is formed from the outer peripheral surface of the running ring which has an approximately trapezoidal cross-section and is support by two rings of rubber or the like lying against the two oblique surfaces opposite the wheel disc forming the joining piece between the running surface and the hub. The embodiment is distinguished both by a high level of noise- and vibration-damping and a high truth of running, so that a greater pre-tensioning of the belt saw blade is possible.

In addition, but independently thereof, the roller includes a sandwich configuration and has at least one elastically resilient, in particular viscoelastic, intermediate layer extending transversely to the central axis and can also serve to damp noise and vibration. Accordingly, the noise-damping material is not stretched in an annular manner around the axis of the saw belt roller but transversely to it.

Three embodiments of a saw belt roller constructed in accordance with the invention are described in more detail below with reference to the attached drawing, in which:

DESCRIPTION OF THE ILLUSTRATED EMBODIMENT

Figure 1:
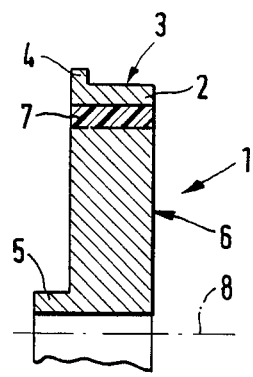
FIG. 1 shows a first embodiment of a saw belt roller constructed in accordance with the invention, in diagrammatic partial section.

The saw belt roller 1 shown in partial section in FIG. 1 consists of an outer ring 2, the peripheral surface 3 of which represents the running surface for the belt saw blade (not shown). On one side, in FIG. 1 the left side, the running surface 3 is limited by a stop collar 4. The hub of the saw belt roller is given the reference numeral 5. The metal joining piece 6 between the hub 5 and the outer peripheral ring 2 or the running surface 3 is interrupted by a layer 7 extending over the periphery, of noise-damping material, in particular hard rubber, silicone or the like. It should be mentioned at this point that it is possible to provide more than one intermediate layer 7 between the running surface 3 and the hub 5.

The geometric axis of the saw belt roller 1 is given the reference numeral 8. As already specified at the outset, the running surface ring 2 consists of a wear-resistant material, preferably steel, ceramic or the like. The hub 5 and joining piece 6 can be produced from a less wear-resistant material, preferably also a metal material.

Figure 2:
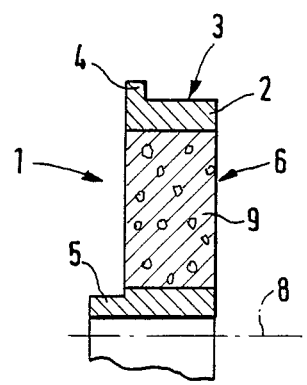
FIG. 2 shows a second embodiment of a saw belt roller constructed in accordance with the invention, in diagrammatic partial section.

The embodiment of FIG. 2 differs from that of FIG. 1 in that the entire joining piece between the running surface ring 2 and the hub 5 is filled with a noise-damping material 9, in particular preferably concrete polymer.

Figure 3:
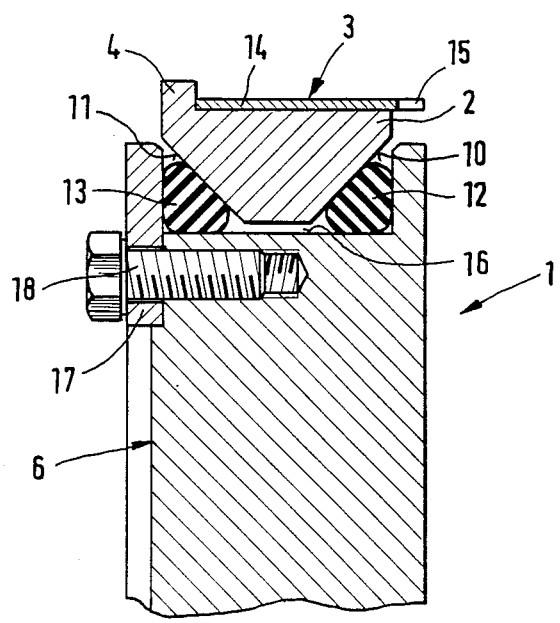
FIG. 3 shows a third embodiment of a saw belt roller constructed in accordance with the invention, in diagrammatic partial section.

In the embodiment of FIG. 3, the running surface 3 is formed from the outer peripheral surface of a running ring 2 which has an approximately trapezoidal cross-section and is supported, by two rings 12, 13 of rubber or the like lying against the two oblique surfaces 10, 11, on the wheel body or on the metal joining piece 6 between the running surface ring 2 and the hub (not shown). The running surface ring 2 shown in FIG. 3, too, has a stop collar 4 for the belt saw blade, which is given the reference numeral 14. The cutting teeth of the belt saw blade 14 are given the reference numeral 15.

The running surface ring 2 of FIG. 3 is supported, both radially and axially, within a peripheral groove formed on the wheel body or on the wheel disc 6 via the rubber rings 12, 13, one lateral limit, in FIG. 3 the left-hand limit, of the peripheral groove 16 being produced by a retaining ring 17 screwed onto the wheel disc 6. The screw connection between the retaining ring 17 and the wheel disc 6 is indicated in FIG. 3 by the fastening screw 18. In the assembled state, the rings 12, 13 of rubber or the like lie in the two corners of the peripheral groove 16. Preferably, O-rings are used for this, the cross-section of which is deformed to be approximately triangular in the assembled state, corresponding to FIG. 3.

As specified above, the saw belt roller 1 can also be produced in a sandwich configuration and have at least one elastically resilient, in particular viscoelastic (silicone) intermediate layer which extends transversely to the central axis 8 of the saw belt roller 1. This embodiment is not shown in the drawing.

Furthermore, the saw belt roller according to the invention is also suitable for vertical belt saws.

All the features disclosed in the documents are claimed as essential to the invention, insofar as they are novel individually or in combination with respect to the state of the art.

I claim:

1. A saw belt roller, in particular for horizontal belt saws and particular for carrying a saw belt, comprising a running surface member (3) consisting of a wear-resistant, hard material, a hub (5), and a continuous member (6) located between the running surface member (3) and the hub (5), said continuous member including a resilient and elastic connecting element of a non-metallic material and ( 7; 9; 12, 13) forming a totally non-metallic and sole connection between said hub and running surface member and thereby damping noise and vibration created by a belt saw running on said running surface member.

2. The saw belt roller according to claim 1, wherein said vibration-damping material is selected from concrete polymer, silicone, rubber, hard rubber, and similar elastomeric material.

3. A saw belt roller, in particular for horizontal belt saws and particular for carrying a saw belt, comprising a wheel disc consisting of a wear resistant and hard material and having a hub (5), an outer peripheral running ring (2) having an approximately trapezoidal cross-section aligned with said wheel disc, said running ring including an outer running surface and two inner oblique surfaces, and two rings (12, 13) of a resilient elastic material and located one each between one of said two oblique surfaces (10, 11) of the running ring and the wheel disc.

* * * * *